(12) United States Patent
Frey et al.

(10) Patent No.: US 7,314,551 B2
(45) Date of Patent: Jan. 1, 2008

(54) FLOW DISTRIBUTION APPARATUS

(75) Inventors: Stanley J. Frey, Palatine, IL (US); Paul A. Sechrist, South Barrington, IL (US); Daniel A. Kauff, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 513 days.

(21) Appl. No.: 10/993,470

(22) Filed: Nov. 19, 2004

(65) Prior Publication Data
US 2006/0108274 A1 May 25, 2006

(51) Int. Cl.
*B01D 15/08* (2006.01)
(52) U.S. Cl. .................. 210/198.2; 210/283; 210/284; 210/285; 210/656; 210/659
(58) Field of Classification Search ................ 210/656, 210/659, 198.2, 283, 284, 285, 289, 290, 210/291, 264, 266
See application file for complete search history.

(56) References Cited

U.S. PATENT DOCUMENTS

| | | | | |
|---|---|---|---|---|
| 3,214,247 | A | 10/1965 | Broughton | 23/288 |
| 3,489,529 | A | 1/1970 | Dudych et al. | 23/285 |
| 3,789,989 | A | 2/1974 | Carson | 210/284 |
| 4,378,292 | A | 3/1983 | Haase | 210/266 |
| 5,972,214 | A * | 10/1999 | Callebert et al. | 210/198.2 |
| 6,024,871 | A | 2/2000 | Harter et al. | 210/198.2 |
| 6,156,197 | A * | 12/2000 | Dessapt et al. | 210/198.2 |
| 6,402,959 | B1 * | 6/2002 | Dessapt et al. | 210/656 |
| 6,454,948 | B2 * | 9/2002 | Ferschneider et al. | 210/659 |
| 6,797,175 | B2 * | 9/2004 | Hotier | 210/659 |

OTHER PUBLICATIONS

Perry's Chemical Engineers' Handbook, 7th Ed., McGraw-Hill, 1997, pp. 6-33-6-34.
Schlichting, Boundary-Layer Theory; McGraw-Hill; (Translation of Grenzschicht-Theorie, Translated by Dr. J. Kestin), 1979 pp. 230-234.
Tan-Atichat and Nagib, "Interaction of free-stream turbulence with screens and grids: a balance between turbulence scales" J. Fluid Mech (1982), vol. 114, pp. 501-528 Great Britain.
Loehrke and Nagib, AGARD Report No. R-598 Experiments on Management of Free-stream Turbulence 1972.

* cited by examiner

*Primary Examiner*—Ernest G. Therkorn
(74) *Attorney, Agent, or Firm*—Frank S. Monlinaro; David J. Piasecki (57) ABSTRACT

Disclosed is a mixer-distributor-collector apparatus for use between beds of solid particles in a fluid-solid contacting vessel. The apparatus includes a solids retaining screen, fluid deflector, passageway, fluid distributor, and flow manipulator. The flow manipulator is a device such as a honeycomb, porous solid, perforated plate, screen, or grid having an open area greater than the open area of the fluid distributor and is located below and spaced apart from the fluid distributor. The apparatus improves the fluid flow characteristics by minimizing or eliminating fluid velocity jets and/or other turbulence which can disturb the downstream particle bed. In an exemplary application, the invention finds use in simulated moving bed (SMB) adsorptive separation processes.

6 Claims, 3 Drawing Sheets

FLOW DISTRIBUTION APPARATUS

FIELD OF THE INVENTION

The subject invention relates to apparatus used to distribute and/or mix fluid. More specifically, the invention relates to an apparatus that distributes and/or mixes fluid flowing in a vessel containing solid particles. In an exemplary application, this invention finds use in simulated moving bed (SMB) adsorptive separation processes.

BACKGROUND OF THE INVENTION

Various apparatus that mix and/or distribute fluid as it flows through a vessel containing solid particles are well known in the art. One or more such devices may be positioned within a vessel and divide the solid particles into two or more beds. The use of such fluid distributing devices can increase the efficiency of operations by providing more uniform fluid properties across the cross-sectional area of the vessel. For example, they can minimize or eliminate flow rate variations or channeling; temperature differences; and variations in the fluid composition. These apparatus may also include a wide variety of means to introduce a fluid stream into the vessel and/or withdraw a fluid stream from the vessel. Such devices will be called "mixer-distributor-collectors".

RELATED ART

Many variations of mixer-distributor-collectors are well known in the art. For example, their use in adsorptive separation or chromatography processes such as SMB adsorptive separations are exemplified in U.S. Pat. Nos. 3,214,247; 3,789,989; 4,378,292; and 6,024,871 each of which is incorporated by reference in its entirety. The following are common components of such apparatus: 1) an upper boundary comprising a means for retaining the bed of solid particles above the apparatus and permitting the flow of fluid downward through the apparatus; 2) a fluid deflection plate located below and spaced apart from the upper boundary; 3) a fluid distributor located below and spaced apart from the deflection plate; and 4) a passageway through the fluid deflection plate which provides fluid communication between the upper boundary and the fluid distributor. Myriad other components and extensive variations for them as well as the common components listed above are also well known in the art.

Desirable characteristics of such mixer-distributor-collectors are also well known in the art. Examples include: 1) having a minimal volume; 2) preventing back mixing; 3) collecting the liquid flowing through the vessel and thoroughly mixing it to minimize localized concentration gradients; 4) providing for the introduction and thorough mixing of another fluid stream when called for; 5) providing for the removal of a fluid stream from the vessel when called for without negatively impacting the operation; and 6) minimizing the pressure drop through the apparatus. Finally, the mixer-distributor-collector is to provide uniform redistribution of the fluid across the cross sectional area of the vessel while precluding high velocity jet streams and/or other fluid turbulence from disturbing the downstream bed of solid particles. The terms "upstream" and "downstream" are used herein in their normal sense and are interpreted based upon the overall direction in which fluid is flowing in the vessel. Thus, downstream is equivalent to a downward or lower location in the vessel.

Perry's Chemical Engineers' Handbook, 7th Edition, edited by D. W. Green et al., published by McGraw-Hill, New York, in 1997, pages 6-33 to 6-34 describe the well known use of adding sufficient uniform resistance across the flow channel to smooth out a non-uniform velocity profile through channels or process equipment. Detailed studies of various fluid flow manipulators and combinations thereof are given by J. Tan-Atichat, H. M. Nagib, and R. I. Loehrke, "Interaction of free-stream turbulence with screens and grids: a balance between turbulence scales", J. of Fluid Mech., (1982), vol. 114, pp. 501-528. The use of fluid flow manipulator devices such as honeycombs, screens, perforated plates, porous solids such as fritted material and mesh blankets, grids, and combinations thereof having sufficient uniform resistance and providing a more uniform redistribution (more uniform velocity profile) at the downstream or outlet boundary of a mixer-distributor-collector is well known in the art. Herein, this component of the mixer-distributor-collector will be referred to as the "fluid distributor".

It has been found that mixer-distributor-collector apparatus of the prior art can create high velocity jet streams and/or turbulence which cause significant movement of the particles in the contact bed immediately below the apparatus even at a relatively low average linear fluid velocity through the vessel. The present invention reduces the fluid jets and/or turbulence to eliminate disturbances to the lower solid particle bed at the low average linear fluid velocity in the vessel. Further, the invention significantly reduces or eliminates disturbances to the particle bed beneath even when the average linear fluid velocity is increased by a factor of about four to about seven.

BRIEF SUMMARY OF THE INVENTION

The present invention provides a more useful mixer-distributor-collector apparatus which minimizes or eliminates the high velocity jets and/or other turbulence which disturb the downstream particle bed. Specifically, the present invention involves the addition of another component, a flow manipulator, to the apparatus which is located between the fluid distributor and the downstream bed of solid particles. The flow manipulator is spaced apart from the fluid distributor and has openings which provide fluid communication from the fluid distributor to the bed of particles beneath. The flow manipulator is a device such as a honeycomb, porous solid, perforated plate, screen, or grid having an open area greater than the open area of the fluid distributor.

DETAILED DESCRIPTION OF THE INVENTION

The subject invention may be used in any process wherein fluid is contacted with solid particles which are divided into a plurality of beds contained in a vessel. The vessel is oriented vertically along its major axis. Although such vessels are typically cylindrical and thus have a circular cross sectional shape, the subject invention is not limited by the cross sectional shape of the vessel. The process may employ one or more such vessels. The fluid flows downwardly in the vessel through the solid particle beds which are separated by mixer-distributor-collectors. Myriad solid particles are used in such processes. Non-limiting examples of groups of such materials each of which have many specific compositions and physical forms include adsorbents, resins, catalysts, and inert materials. The fluid may be a vapor, liquid or supercritical fluid. Although the invention is not intended for multiple fluid phases, the fluid may contain many compounds or be a mixture of multiple fluid streams provided they are all substantially of one phase. Thus, in one embodiment, all of the fluid is the same phase. However, the invention contemplates a wide range of mixtures and process conditions such that there may be a small amount of a second phase. Thus, as used herein, the terms "substantially single fluid phase" and "substantially of one phase" mean that at least 95% by weight of the fluid is of one phase. Likewise, when stated herein that the fluid is substantially liquid, it means that at least 95% by weight of the fluid is liquid. Many such processes are well known in the refining and petrochemical industries, including for example various reaction and separation processes. In one embodiment, the process is an adsorptive separation process.

A detailed description and various embodiments of the subject invention will now be given by reference to the accompanying drawings. The drawings are simplified schematic views, not to scale; only showing components necessary for an understanding of the invention. The drawings are presented to illustrate some embodiments of the invention and are not intended to limit the scope of the invention as set forth in the claims.

Figure 1:
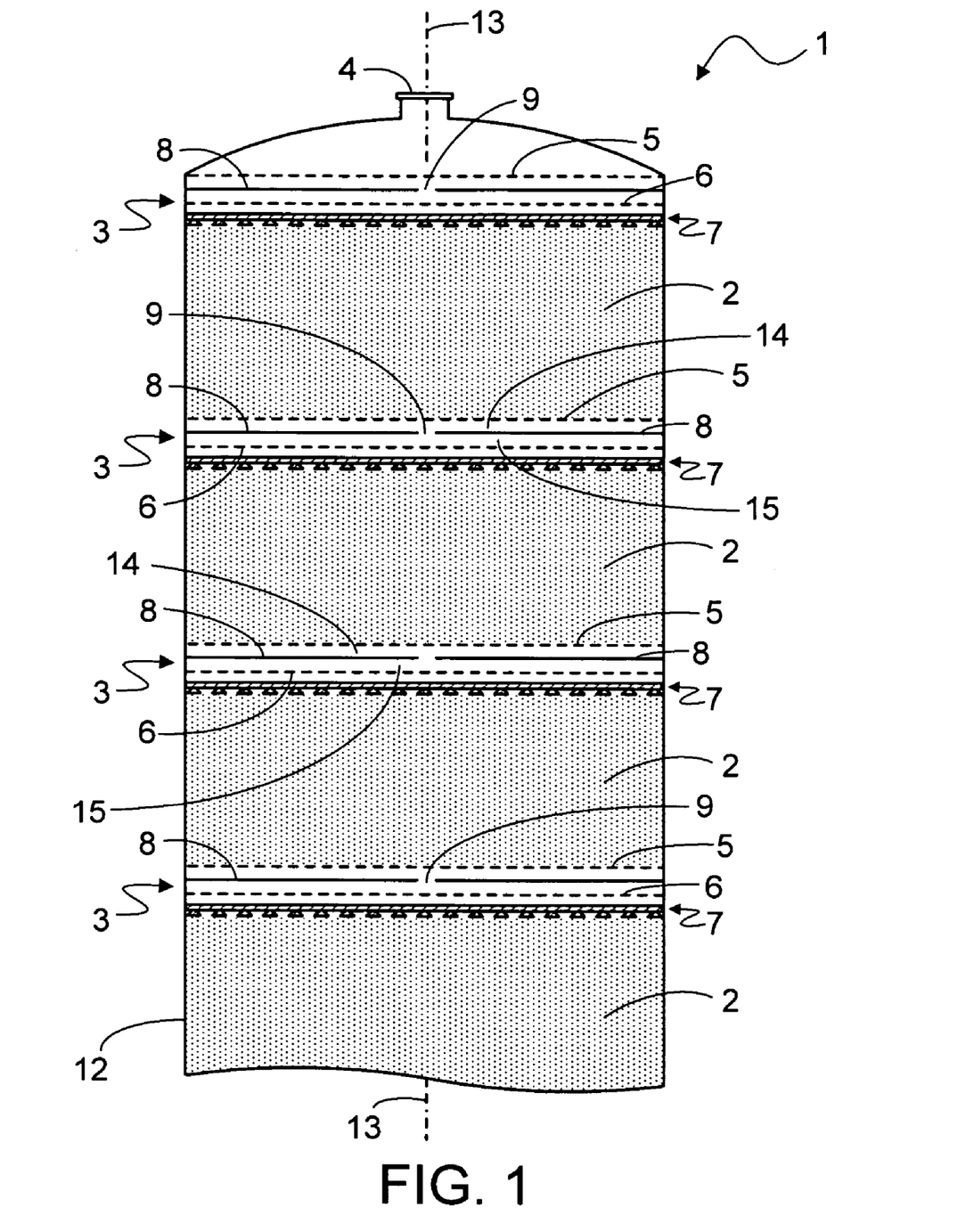
FIG. 1 is a sectional side view of a vessel depicting a vessel containing a plurality of superposed particle beds with intermediate mixer-distributor-collectors.

FIG. 1 illustrates a vertically positioned vessel 1 adapted to hold a plurality of vertically spaced superposed particle beds 2. There may be two to twelve or more particle beds in a single vessel. The beds are separated by mixer-distributor-collectors 3 according to the subject invention. The optional use of a mixer-distributor-collector 3 above the uppermost particle bed is also illustrated. One or more fluid streams are introduced to the upper portion of the vessel 1 by way of an inlet port 4. The fluid flows downwardly through the vessel contacting each particle bed 2 and mixer-distributor-collector 3 in sequence and is removed from the lower portion of the vessel by way of an outlet port not shown. An optional mixer-distributor-collector may also be located below the lowest particle bed in the vessel. As shown, upper boundary 5, fluid distributor 6, and flow manipulator 7 are components of the mixer-distributor-collector apparatus 3 and are arranged substantially parallel with respect to each other and substantially perpendicular to the vertical axis or major centerline of the vessel represented by imaginary line 13.

"Substantially parallel" as used herein refers to the overall spacing of the components of the apparatus so that they are essentially parallel in construction. Flexing or distortions of the components such as from construction, installation, or load bearing may occur. For example, the solids retaining screen (upper boundary) may exhibit some major deflections when supporting a significant weight of particles. This will not preclude reference to components as being in substantially parallel arrangement with respect to each other.

"Substantially perpendicular" as used herein shall refer to an approximate normal positioning of various components of the apparatus. In some instances slight variations may occur in various components of the apparatus in construction, installation, or by virtue of their bearing weight which may cause deflections. This may cause the components to lie in planes which are not exactly perpendicular to a given axis. Thus, the term "substantially perpendicular" as used herein shall include angles within the range from about 85 to about 95 degrees.

Upper boundary 5 may be similar to any of the well known means used in the art for retaining the solid particles above the apparatus while permitting the downward flow of fluid through the apparatus. Examples of such means include a wide variety of screens, grids, perforated plates and combinations thereof. In one embodiment, the upper boundary comprises a perforated plate and a screen with properly sized openings to retain the particles which overlays the plate. In another embodiment, a particular type of grid commonly known as "profile wire screen" is used as the upper boundary. Profile wire screen provides a highly regular slotted surface that is resistant to blockage (plugging) from extended contact of the outer face of the profile wires with solid particles. Furthermore, the rigidity of the profile wire screen, regardless of slot opening, can be tailored according to the spacing and thickness of support bars used to join each individual, parallel extending, profile wire. Normally, the support bars are welded to each profile wire at the inner face of the profile wires, that is, the face not in direct contact with the solid particles. Support bars and profile wire are generally affixed perpendicularly to each other, but other angles of alignment are also known. Profile wire screen for this application is normally in a form known in the industry as a Johnson Screen (available from U.S. Filter Company, St. Paul, Minn.) or as a profile wire screen available from other suppliers worldwide. The upper boundary of the mixer-distributor-collectors is commonly referred to in the art as the solids retaining screen regardless of its specific structure.

The fluid distributor 6 is located below and spaced apart from the solids retaining screen (upper boundary) to define the volume of the mixer-distributor-collector, V, between the upper boundary 5 and the fluid distributor 6. Fluid deflection plate 8 is located between and spaced apart from the upper boundary 5 and fluid distributor 6. The substantially imperforate fluid deflection plate 8 is located within the apparatus volume, V, and divides it into an upper volume 14 located between the upper boundary 5 and the deflection plate 8 and a lower volume 15 located between the deflection plate 8 and the fluid distributor 6. The deflection plate 8 contains a passageway 9 which is defined as an opening in the plate providing fluid communication between the upper volume 14 and lower volume 15 of the apparatus. The fluid deflection plate 8 serves to collect the fluid across the cross sectional area of the vessel below the upper particle bed and thorough mixing occurs as the fluid is forced through passageway 9 with a sufficient pressure drop. In an embodiment, multiple passageways may be used. In an embodiment the ratio of the cross sectional area of the vessel below the particle bed to the total cross sectional area of the passageway(s) 9 is within the range from about 5:1 to about 60:1. In another embodiment, the ratio of the cross sectional area of the vessel below the particle bed to the total cross sectional area of the passageway(s) is within the range from about 15:1 to about 30:1. The passageway may be of any shape; however, regular shapes such as circular, oval, and rectangular are normally used for ease of fabrication. The passageway may be formed in any conventional way such as cutting or punching an opening through the deflection plate. The deflection plate 8 may comprise multiple pieces which are arranged and secured by conventional means to form the essentially impervious deflection plate with an opening or openings that define the passageway. The passageway may be completely surrounded by the deflection plate, or it may completely traverse the plate such that the passageway is seen as being located between two deflection plate portions as illustrated in FIG. 1. Although the single, central passageway as illustrated in FIG. 1 may be sufficient for relatively small diameter column, other configurations are common for commercial scale processes as detailed later. The passageway 9 is defined herein to include the opening through the fluid deflection plate 8 and the volume above and below the opening between the upper boundary 5 and the fluid distributor 6. Using this definition, it can be seen that the passageway can entirely traverse the volume, V, of the apparatus and provide fluid communication between the upper boundary and fluid distributor.

The apparatus volume, V, will usually be partially occupied by one or more other component(s). For example, there may be one or more supporting members such as braces or spacers that help maintain the separation between the solids retaining screen (upper boundary) and the fluid distributor. Supporting members may also be used to provide separation between these components and the deflection plate. There may also be load bearing bars or a support grid extending across the column to reinforce and support the solids retaining screen. Other optional but common components located within the apparatus volume, V, will be detailed later herein.

Fluid distributor 6 provides for the distribution or redistribution of the fluid across the cross sectional area of the vessel to maintain a uniform velocity profile or plug flow of the fluid in the vessel. This function is important for example to maintain a uniform residence time of the fluid when contacting a catalyst bed to achieve a desired reaction, or to maintain a sharp composition profile in the mobile fluid phase when contacting with an adsorbent to achieve a desired separation of components in an adsorptive separation process. The design of devices such as perforated plates, screens, grids, porous solids, honeycombs, and combinations thereof to improve and/or maintain a uniform velocity profile (plug flow) of fluid is well known by those of ordinary skill in the art as evidenced by the previously referenced pages of Perry's Chemical Engineers' Handbook wherein the number of velocity heads of pressure drop (K) is on the order of 10. In one embodiment, the fluid distributor comprises a perforated plate and an adjacent screen. In another embodiment, the fluid distributor is a profile wire screen.

The flow manipulator 7 is spaced apart from and located below the fluid distributor 6. As used herein the term flow manipulator means any device used to alter the manner in which fluids travel through a vessel or conduit, such as in affecting the mean and fluctuating components of velocity. Examples of flow manipulators include: screens; grids; perforated plates; honeycombs; porous solids such as fitted materials and mesh blankets; and combinations thereof. The flow manipulator 7 serves to significantly reduce or eliminate the fluid velocity jets and/or turbulence which can issue from and/or be created by the fluid distributor 6 and cause significant disturbance to the subsequent particle bed if the flow manipulator is not present. Disturbances to the lower particle bed can have a significant negative impact on the operating process such as breaking the particles into small fragments which then plug portions of the particle bed causing non-uniform velocity profiles (channeling) and unacceptable pressure drops.

Thus, the subject mixer-distributor-collector has the following minimum components: an upper boundary 5, fluid deflection plate 8, passageway 9, fluid distributor 6, and flow manipulator 7. The subject mixer-distributor-collector apparatus also requires that the flow manipulator 7 must be spaced apart from the fluid distributor 6 and the open area of the flow manipulator be greater than the open area of the fluid distributor. That is, the ratio $OA_M/OA_D$ is greater than 1, where $OA_M$ is the open area of the flow manipulator and $OA_D$ is the open area of the fluid distributor. The "open area" of such components is herein defined as the total cross sectional area of the openings, $A_O$, divided by the total cross sectional area of the component, $A_T$, expressed as a percentage where these cross sectional areas are taken in "primary plane" of the component. The "primary plane" of a component is herein defined as the plane through the component which is normal to the overall fluid flow having the smallest $A_O$.

The subject mixer-distributor-collector apparatus may be fabricated and installed by any means known by those of ordinary skill in the art. Thus, the apparatus may be constructed from any material which can withstand the operating conditions such as the temperatures and pressures of the specific process intended. The materials must also be compatible with the fluids they will contact. Usually the same material will be used for all the components of the apparatus but this is not required. Typically in larger vessels at least some of the components are made of a suitable metal to provide the strength needed to support the upper bed of particles. The apparatus may be supported in the vessel by any known means such as support rings on the inner wall of the vessel; support beams extending from the vessel shell; and/or vertical support members such as hubs. The apparatus can be installed in a variety of well known ways. Smaller vessels such as laboratory or bench scale units may have vertical portions with fittings such that the mixer-distributor-collector apparatus can be inserted whole between the portions. In commercial scale vessels, the apparatus is usually designed and fabricated in segments that fit through a manway or port in the vessel shell and are assembled within the vessel. Each component of the apparatus can be assembled individually from multiple pieces and the apparatus built up by layers. In another embodiment, the apparatus is designed in segments where each segment comprises all layers and components of the apparatus. These segments are arranged and assembled to form the apparatus across the cross section of the vessel.

Figure 2A:
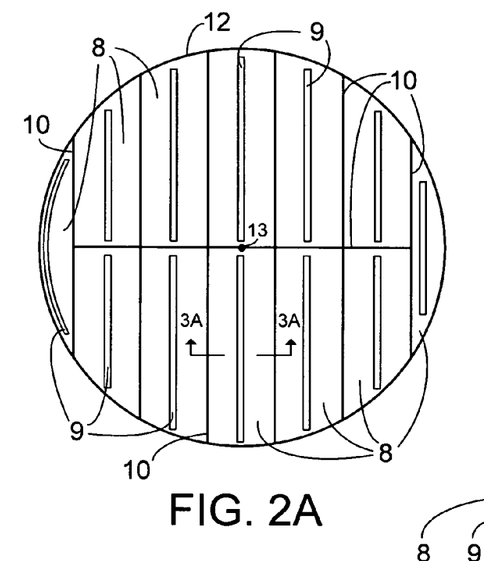
FIGS. 2A-2C are overhead sectional views depicting mixer-distributor-collector sections assembled within vessels.
Figure 2B:
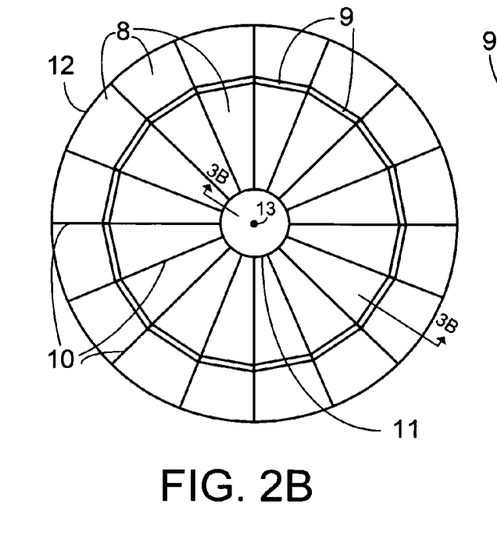
Figure 2C:
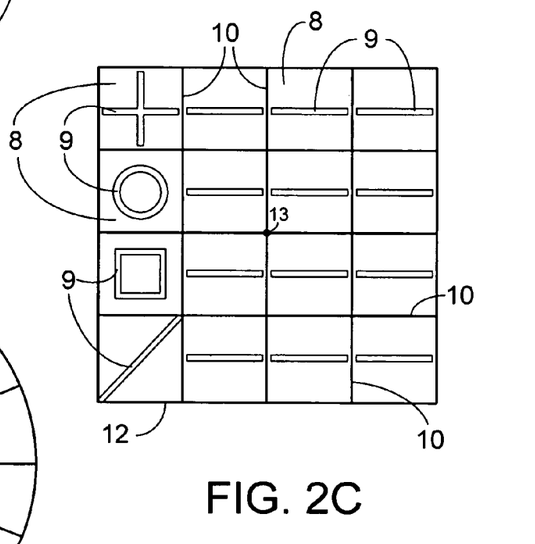

FIGS. 2A-2C illustrate three examples of such segmental arrangements as viewed looking down the vessel at an elevation just below the upper boundary of the apparatus. That is, the solids retaining screen is not shown in FIGS. 2A-2C in order to provide a clear view of how segments of the apparatus may be arranged. In FIG. 2A, the vessel is cylindrical as indicated by the circular cross section, vessel shell 12 and vertical axis 13. The ribs 10 define the side boundaries between adjacent segments. The apparatus segments may be supported by any well known means such as support beams or a grid which are attached, usually in a removable manner, to the inner surface of the vessel shell. In the ten central segments and the right chordal segment the passageways 9 are illustrated as a single rectangular opening through and surrounded by the fluid deflection plates 8. The chordal segment on the left side of FIG. 2A shows that the passageway 9 may be curved to follow vessel shell. FIG. 2B depicts another possible configuration of the mixer-distributor-collector in a cylindrical vessel or column. In this embodiment, a support hub 11 is located in the center of the column. This hub is typically a pipe which is aligned with the major centerline or vertical axis 13 of the vessel. The ribs 10 define the side walls of the segments and radiate out from the support hub 11 extending to the outer edges of the particle beds at the inner surface of the vessel shell. In an embodiment the ribs are attached to the support hub and inner surface of the vessel shell by any well known means such as welding or bolting. The ribs 10 may be sufficiently strong to support the mixer-distributor-collector themselves. In FIG. 2B, the passageway 9 of each segment is a narrow rectangular opening that completely traverses the fluid deflection plate 8 between the ribs 10. The fluid deflection plate may be considered as being comprised of an inner portion extending from the hub to the passageway and an outer portion extending from the passageway to the vessel shell. In one embodiment, the ratio of the distance of the passageway from the central support hub to the distance of the passageway from the inner surface of the vessel is within the range from about 2.9 to about 1.3. Thus, multiple portions may be used to define the fluid deflection plate 8 and passageway 9 within the volume of the apparatus, V. In another embodiment not shown, the passageway 9 may be defined by two arcs that traverse the fluid deflection plate between the ribs. FIG. 2C illustrates the arrangement of apparatus segments within a vessel having a square cross sectional area with shell 12 and centerline 13. Each segment may have the same configuration to simplify fabrication and assembly. However, this is not required. One or more segments of the apparatus may differ as is illustrated by examples of various passageway 9 configurations shown on the left side of FIG. 2C. The units or segments of the apparatus may be designed in any manner such that they can be assembled to form the apparatus across the cross section of the vessel below the particle bed. Each segment of the apparatus may be of a unique cross sectional shape; however, it is usually more efficient to design the apparatus minimizing the number of different segment designs.

Figure 3A:
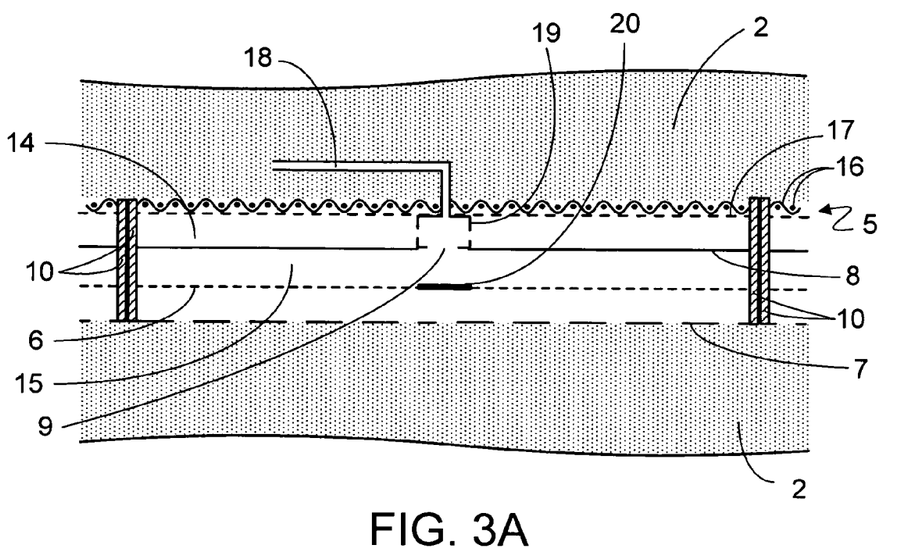
FIGS. 3A and 3B are sectional side views taken along the section lines marked in FIGS. 2A and 2B, respectively, of additional embodiments of the invention.
Figure 3B:
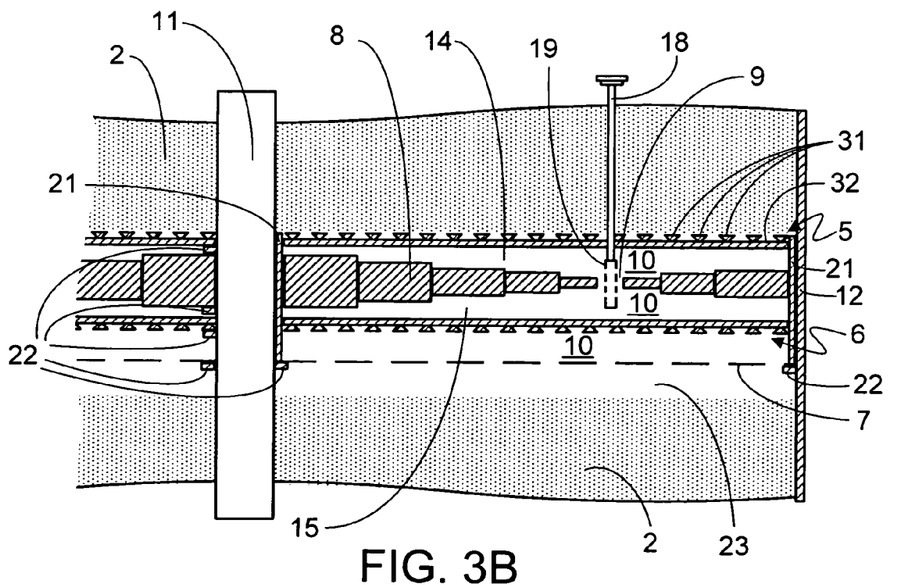

FIGS. 3A and 3B illustrate additional details and embodiments of the invention. The views in FIGS. 3A and 3B correspond to the section lines marked in FIGS. 2A and 2B respectively. However, the additional components shown in FIGS. 3A and 3B represent different embodiments than those previously discussed. In the embodiment illustrated in FIG. 3A, the upper boundary 5 comprises a wire screen 16 which overlays a perforated plate 17. In this embodiment, each segment is fabricated with its own ribs 10 such that adjoining segments will meet along the outer surfaces of the adjoining ribs as illustrated in FIG. 3A. In another embodiment not shown, a single rib 10 may be used between each adjoining segment. In such embodiments, the ribs may be secured to the vessel and be sufficient to support the apparatus. For example, the segments, preassembled from the remaining components, can be set on a bottom ledge of the ribs. In these and other embodiments, the ribs 10 or walls defining the segments may be solid as illustrated, while in other non illustrated embodiments they may have openings to permit the mixing of fluid between the segments arranged in the same plane. Other optional components illustrated in FIG. 3A include the conduit 18 and mixing box 19. The conduit 18 serves as a means to introduce or withdraw fluid from the volume, V, of the mixer-distributor-collector apparatus when this act is required by the process. The connection of single as well as multiple conduits to mixer-distributor-collectors is well known. It is also known that each segment may have its own conduit or conduits and these may be connected to a distribution manifold within the vessel to minimize the number of perforations required through the vessel shell. Thus, the conduits provide fluid communication between the volume of the apparatus and other equipment outside the vessel shell. Although the conduit 18 may simply be in open communication with the volume of the apparatus, it is common for the conduit 18 to be connected to a mixing chamber or box 19 which is located at least partially within the volume of the apparatus, V. The use of multiple mixing boxes and/or baffles within a mixing box is known as are a wide variety of their configurations. In the illustrated embodiment, mixing box 19 is located in the upper volume of the apparatus 14 and overlays the opening through the fluid deflection plate. In this embodiment, openings in the mixing box 19 cooperate with passageway 9 to provide fluid communication between the upper 14 and lower 15 volumes of the mixer-distributor-collector. Thus, it can be seen that most of the mixing box is within passageway 9 according to the previously given definition of the passageway. That is, the mixing box is partially within the passageway. In other embodiments not illustrated, the entire mixing box 19 is within the passageway, or the mixing box is located adjacent to the passageway. The mixing box need not block the opening in the fluid deflection plate. For example, the bottom edge of the mixing box may be positioned above the fluid deflection plate. In another embodiment not illustrated, the mixing box is a pipe or rectangular conduit positioned within and running the length of the passageway. The mixing box 19 will have at least one slot or other opening to provide fluid communication with the volume of the mixer-distributor-collector. Thus, the mixing box provides for the addition and/or withdrawal of fluid at or near the location of vigorous mixing as the fluid moves through the passageway. Placement of the mixing box and/or baffles may be used to increase the mixing intensity by changing the direction of fluid flow and/or further reducing the cross sectional area available for the fluid to move from the upper volume 14 to the lower volume 15. When the apparatus is formed from segments, it is typical but not required for each segment of the apparatus to have each component of the embodiment being used. Another optional component of the apparatus is splash plate 20. Splash plate 20 is an imperforate surface which may be used to reduce the vertical momentum of the fluid before it passes through the fluid distributor 6 which in this embodiment is a perforated plate. In this embodiment, the flow manipulator 7 is also illustrated as a perforated plate.

As required, the flow manipulator 7 is shown as being spaced apart from the fluid distributor. In one embodiment, the distance between the fluid distributor 6 and flow manipulator 7 is a function of the mesh or pitch of the fluid distributor 6. The pattern of openings and the openings themselves in components such as the upper boundary 5, fluid distributor 6, and flow manipulator 7 will typically be uniform, but this is not required. There may be natural variances for example due to the fabrication process and/or intentional variations such that there may be variation in the size and/or shape of the openings and/or their pattern (layout). In one embodiment, the mean diameter or width or span of openings on such components ranges from about 0.5 mm to about 5 mm (0.02 to 0.2 inches). In other embodiments, or other components within the same embodiment, the mean diameter or width or span of such openings is about 0.1 mm (0.004 inches). The openings through the different components may of course differ substantially. Therefore, the mesh, M, is herein defined as the mean centerline distance between adjacent openings in the primary plane of the component. In this embodiment, the distance, X, between the bottom of the fluid distributor 6 and the top of the flow manipulator 7, is effective as defined by the ratio, $X/M_D$, where $M_D$ is the mesh of the fluid distributor 6 and $X/M_D$ is at least 1. In another embodiment, the distance, X, is effective when the ratio $X/M_D$ is within the range of from about 2 to about 50. In yet another embodiment, the effective distance, X, is defined by the ratio $X/M_D$ being within the range of from about 4 to about 25. In certain embodiments, the effective distance, X, is within the range from about 5 mm (0.2 inches) to about 20 mm (0.8 inches). In other embodiments the effective distance, X, is within the range from about 10 mm (0.4 inches) to about 15 mm (0.6 inches). To improve the structural integrity of the apparatus each of the upper boundary 5, fluid deflection plate 8, fluid distributor 6, and flow manipulator 7 will usually be attached to the ribs. Other optional components not illustrated are also well known in the art. For example, solid pieces with relatively small cross sectional area exposed to the overall direction of the fluid may be used as spacers to help maintain the desired vertical separation of the components of the apparatus.

In the embodiment illustrated in FIG. 3B, the upper boundary 5 is defined by a profile wire screen where the profile wires 31 are of a trapezoidal cross section with the largest surface of the trapezoids contacting the particle bed and the opposite surface of the profile wires being affixed to rectangular support bars 32. Profile wires 31 and support bars 32 may be of any cross sectional shape and they may differ in the same screen. In this embodiment, the fluid distributor 6 is also made of the same profile wire screen as the upper boundary. In other embodiments not shown, these components may be profile wire screens with different configurations. These components may also have different structures as previously discussed. For example, one may be a profile wire screen while the other is a perforated plate, or one may be a honeycomb and the other a grid. The present invention also contemplates various orientations of the components which are not illustrated. For example, honeycombs may have tapered openings and these may be oriented with the face having smaller openings on either the upper or lower surface of the honeycomb. The same is true of other devices in which the cross sectional profile varies along the height or are otherwise non-symmetrical. For example, grids such as profile wire screens may be oriented with either the profile wire or the support bars on the downstream side of the device, and devices with non-symmetrical patterns of openings such as slots may be rotated in their horizontal plane so that the openings may be oriented in any manner with respect to the horizontal component of the fluid velocity. In one such embodiment, the profile wire screen in FIG. 3B would be rotated 9° in the horizontal plane so a similar view would show the cross sections of multiple support bars and the side face of a single profile wire. In an embodiment, the average size of particles in the bed is at least twice the average opening between the profile wires. As indicated in FIG. 3B, the inner surface of rib 10 is visible when looking through this sectional view of the mixer-distributor-collector. FIG. 3B also illustrates that the fluid deflection plate 8 may be tapered in a stepwise fashion as illustrated with the thinnest portion of the fluid deflection plate 8 being closest to the passageway 9 for both portions of the deflection plate. In other embodiments not illustrated, the fluid deflection plate 8 may be tapered such that its cross section in an equivalent view would be generally triangular or trapezoidal. The conduit 18 is shown to be in communication with the volume of the apparatus through the mixing box 19. As shown, the mixing box 19 may be a rectangular chamber running the length of the passageway and extending through the passageway to be in communication with either the upper 14 or lower 15 volumes of the apparatus or both. In this embodiment, the flow manipulator 7 is illustrated as a perforated plate spaced apart from the fluid distributor 6. However, it is emphasized that the flow manipulator may be any of the group of manipulators as previously discussed and such devices may be used in combination to define the flow manipulator. The mixer-distributor-collector as shown on the right side of hub 11 in FIG. 3A extends across the vessel from the hub 11 to the inner surface of the vessel shell 12 to separate the annular particle beds 2. Terminal plates 21 are optional components which may be used to further improve the structural integrity of the apparatus sections. As shown these terminal plates 21 may serve to enclose the section ends adjacent the hub and vessel shell. They may be planar or curved to provide a closer fit to the curvature of the respective surfaces they are adjacent. As shown, to the right of the hub in FIG. 3B, the section thus defined by the two ribs 10 (only one of which is shown), the two terminal plates 21, the upper boundary 5, and the flow manipulator 7 may be attached to the vessel shell 12 and hub 11 via support rings 22. To the left of hub 11 in FIG. 3A another embodiment is shown wherein each layer of the apparatus is attached by separate support rings 22. Such an embodiment may be used when desired to assemble the apparatus in horizontal layers rather than by sections. It also illustrates that the support rings or other means of attaching the components of the apparatus to the vessel can be used to attain the desired spacing between the components. FIG. 3B also illustrates another optional configuration of the invention whereby the mixer-distributor-collector is spaced apart from the lower bed of solid particles as indicated by void space 23. In one embodiment, the distance from the bottom of the flow manipulator to the top of the lower particle bed is within the range from about 3 mm (0.1 inches) to about 38 mm (1.5 inches).

In one embodiment, the subject invention is used in a SMB adsorptive separation process. The practice of the subject invention is not believed to be related to or limited to the use of any particular type of SMB process or any particular adsorbent/desorbent combination. The general technique employed in the performance of a simulated moving bed (SMB) adsorptive separation is well described in the literature. For instance, a general description directed to the recovery of para-xylene is presented at page 70 of the September 1970 edition of Chemical Engineering Progress (Vol. 66, No 9). The simulated moving bed technique is also described in R. A. Meyers, Handbook of Petroleum Refining Processes, pages 8-85 to 8-87, McGraw-Hill Book Company (1986) and in the Adsorption, Liquid Separation section of the Kirk-Othmer Encyclopedia of Chemical Technology, 2002, John Wiley & Sons, Inc. Countercurrent SMB systems are described in many available references, such as U.S. Pat. No. 2,985,589, incorporated herein by reference in its entirety. Equipment utilizing these principles can vary in size from the pilot plant scale shown in U.S. Pat. No. 3,706,812 to commercial petrochemical plant scale, with flow rates ranging from a few cc per hour to many thousands of gallons per hour. Large scale plants normally employ rotary valves having a port for each conduit while small scale and high pressure units tend to use valves having only two or three ports. The invention may also be employed in a SMB adsorptive separation process which simulates cocurrent movement of the adsorbent, like that disclosed in U.S. Pat. Nos. 4,402,832 and 4,478,721. The functions and properties of adsorbents and desorbents in the chromatographic separation of liquid components are well-known, and reference may be made to U.S. Pat. No. 4,642,397, which is incorporated herein by reference, for additional description of these adsorption fundamentals. In an embodiment, the fluid is substantially a liquid.

Existing SMB process units may be readily adapted to operate under the claimed invention. Practice of the subject invention requires no significant changes in the operating conditions of the unit. The changes could be made any time the SMB process is halted such as for a scheduled turnaround, unit revamp, or adsorbent reloading. After the SMB process unit is safely brought to an idle state, the adsorbent would be unloaded and the existing mixer-distributor-collectors would be removed. New mixer-distributor-collectors according to the subject invention could be available for immediate installation. Or, the existing mixer-distributor-collectors could be easily modified by adding a flow manipulator according to the subject invention. In one embodiment where the existing mixer-distributor-collectors are assembled from segments, the flow manipulator could be added as the lowest component layer to each segment for example by attaching via spacers and/or supports to the ribs or fluid distributor. In another embodiment, the flow manipulator could be assembled across the entire cross section of the vessel beneath the existing mixer-distributor-collector by attaching to the existing mixer-distributor-collector or by attaching to the vessel shell.

As previously discussed, the open area of the fluid manipulator, $OA_M$, must be greater than the open area of the flow distributor, $OA_D$. In one embodiment the ratio $OA_M/OA_D$ is from about 1.5 to about 15. In another embodiment the ratio $OA_M/OA_D$ is from about 2.0 to about 12. In another embodiment the ratio $OA_M/OA_D$ is from about 2.5 to about 7. In one embodiment, $OA_D$, as determined from the process conditions and number of velocity heads of pressure drop (K), ranges from about 1% to about 20%. In another embodiment $OA_D$ ranges from about 6% to about 12%. In one embodiment $OA_M$ ranges from about 25% to about 50%. In another embodiment $OA_M$ ranges from about 30% to about 40%. As previously discussed, another parameter which can be used to characterize the fluid distributor and the flow manipulator is the mesh, respectively $M_D$ and $M_M$. In one embodiment the ratio $M_D/M_M$ is less than about 5. In another embodiment the ratio $M_D/M_M$ is less than about 3. In yet another embodiment the ratio $M_D/M_M$ is less than 1.5. Since the mesh as previously defined is always a positive number, it follows that the ratio of two mesh values must also be a positive number.

A set of experiments were conducted as follows to verify the improved performance of the subject invention. The overall system consisted of a vertically oriented cylindrical Plexiglas column with a 457 mm (18 inch) diameter. A liquid (water) was introduced to the top of the column at ambient conditions by a pump connected to a liquid supply tank. The volumetric liquid flow was controlled by adjusting the pressure in the line connecting the pump to the column and monitored by a flow meter. Water was recirculated from the bottom of the column through a line to the liquid supply tank. Various mixer-distributor-collectors were evaluated by placing them so that the upper boundary was located 508 mm (20 inches) below the liquid inlet. In all tests the upper boundary consisted of a No. 100 USA Standard ASTM Specification E-11 wire screen which was supported by a grid. The fluid deflection plate was similar to that depicted in FIG. 1 and consisted of two solid plates of substantially constant thickness having chordal cross sectional areas separated by a rectangular passageway extending along the diameter of the column. The width of the passageway (distance between the two portions of the fluid deflector) was 127 mm (5 inches). In all tests, a solid rectangular block was supported in and throughout the length of the passageway to mimic a mixing box. The spacing between each side of this solid block and the respective sides of the fluid deflection plate varied between about 3.6 mm (0.14 inches) and 14.2 mm (0.56 inches). The solid block was usually centered in the passageway, but in some tests the solid block was about 1 mm (0.04 inches) closer to one edge of the deflection plate than the other. None of these variations in the size and position of the solid block had a noticeable impact on the results. Another variable that had no noticeable affect in these tests was the optional use of a splash plate below the passageway. The fluid distributor was either a perforated plate or a profile wire screen with different parameters as listed in Table 1. Various perforated plates with parameters as listed in Table 1 were used as the flow manipulator. The spacing between the fluid distributor and the flow manipulator in all cases was held constant at about 8 mm (0.31 inches). A level bed about 51 mm (2 inches) in height of solid spherical particles of about 0.8 mm (0.03 inch) diameter was positioned below the mixer-distributor-collector apparatus in each test. The distance between the bottom of the apparatus and the top of this particle bed varied between about 9.5 mm (0.375 inches) to about 38 mm (1.5 inches) without noticeable impact on the results. These solid particles had a density of about 1.8 g/cc after fully absorbing water. This density sometimes referred to as the piece or particle density is calculated from the volume of the individual pills and the weight of the pills plus the absorbed water. Thus, piece density is higher than the bulk density since the bulk density is determined from the same weight, but the volume also includes the void or interstitial volume between the pills in a bed which adds no weight. The solid particle bed was supported by a bed of nominal 1.5 mm (0.06 inch) diameter glass beads about 25 mm (1 inch) high which rested on a bed of nominal 2.5 mm (0.1 inch) diameter glass beads about 25 mm (1 inch) high which in turn rested on bed of nominal 6.3 mm (0.25 inch) diameter alumina spheres about 305 mm (12 inches) high. This last bed was supported by a grid covered with a No. 100 USA Standard ASTM Specification E-11 wire screen located about 616 mm (24 inches) above the bottom of the column. For each test, the 51 mm high solid particle bed was leveled and the mixer-distributor-collector was installed in the column. The column was then slowly filled with water without disturbing the particle bed. Once the system was liquid full, the water rate was raised to obtain a downward mean linear velocity of about 9 mm/s (0.03 ft/s) and the particle bed below the mixer-distributor-collector was visually observed for movement. Disturbances to the particle bed were classified on a subjective scale as summarized in Table 2. After the effect on the bed was judged, the mean linear velocity was increased and another observation made. The results for the tests as summarized in Table 3 clearly demonstrate the improved performance of mixer-distributor-collectors D and especially E.

TABLE 1

Mixer-Distributor-Collector Parameters

| | | Fluid Distributor | | Flow Manipulator | |
|---|---|---|---|---|---|
| ID | Type | Open Area | Mesh (mm) | Open Area | Mesh (mm) |
| A | Profile wire screen | 9.8% | 1.3 | None used (prior art) | |
| B | Perforated Plate | 0.35% | 25.4 | 4.7% | 20.8 |
| C | Perforated Plate | 2.0% | 43.2 | 41% | 2.4 |
| D | Perforated Plate | 6.0% | 9.3 | 41% | 2.4 |
| E | Profile wire screen | 9.8% | 1.3 | 41% | 2.4 |

TABLE 2

Degree of Disturbance to the Lower Particle Bed

| Score | Description |
|---|---|
| 0 | No movement of any particles |
| 1 | Minor movement, limited to a small portion of bed |
| 2 | Liquid jets indicated by holes "drilled" into bed |
| 3 | Turbulence indicated by fluidization |
| 4 | Deep patterns created in the bed, ~25 mm or more |

TABLE 3

Degree of Disturbance to the Lower Particle Bed for Various Mixer-Distributor-Collectors and Fluid Mean Linear Velocities

| | Mixer-Distributor-Collector ID | Fluid Mean Linear Velocity, mm/s (ft/s) | | | | | |
|---|---|---|---|---|---|---|---|
| Test # | | 9 (0.03) | 15 (0.05) | 21 (0.07) | 27 (0.09) | 36 (0.12) | 61 (0.20) |
| | | Degree of Disturbance Score from Table 2 | | | | | |
| 1 | A | — | — | — | — | — | 4 |
| 2 | A | — | 3 | 3 | — | 4 | — |
| 3 | A | 2 | 3 | 4 | — | — | — |
| 4 | B | 2 | 3 | 4 | — | — | — |
| 5 | C | 2 | 2 | 4 | — | — | — |
| 6 | D | 0 | 0 | 1 | — | 4 | — |
| 7 | E | 0 | 0 | 0 | — | 1 | 1 |
| 8 | E | 0 | 0 | 0 | 0 | 0 | — |

What is claimed is:

1. A mixer-distributor-collector apparatus located between an upper and a lower bed of solid particles in an adsorbent vessel of a simulated moving bed adsorptive separation process having a vertical axis said apparatus comprising:

an upper, solids retaining, profile wire screen;

a lower fluid distributing profile wire screen being substantially parallel to the upper solids retaining profile wire screen, the screens being substantially perpendicular to the vertical vessel axis;

a central support hub being aligned with the vertical vessel axis;

ribs located between the screens and radiating from the central support hub to an inner surface of the vessel to define a plurality of segment volumes between the screens and the ribs;

each segment volume containing a fluid deflection plate radiating from the central support hub to an inner surface of the vessel to define an upper volume between the upper solids retaining screen and the fluid deflection plate and a lower volume between the fluid deflection plate and the lower fluid distributing screen;

a passageway through the fluid deflection plate providing fluid communication between the upper and lower volumes within the segment volume;

a mixing box located at least partially within the segment volume adjacent the passageway, the mixing box having openings providing fluid communication between the mixing box and the segment volume;

a fluid transfer conduit being connected to and in fluid communication with the mixing box; and a flow manipulator selected from the group consisting of perforated plates, screens, honeycombs, porous solids, and grids, the flow manipulator being substantially parallel to the screens and located above the lower bed of solid particles;

wherein the flow manipulator having an open area of from about 30% to about 40% is located below and spaced apart from the lower fluid distributing profile wire screen by an effective distance X.

2. The apparatus of claim 1 wherein the lower fluid distributing profile wire screen has an open area of from about 6% to about 12%.

3. The apparatus of claim 1 wherein at least a portion of the mixing box is located at least partially within the passageway.

4. The apparatus of claim 1 wherein the passageway substantially traverses the fluid deflection plate between the ribs of the segment volume such that the ratio of the distance of the passageway from the central support hub to the distance of the passageway from the inner surface of the vessel is within the range from about 2.9 to about 1.3.

5. The apparatus of claim 1 wherein the effective distance, X, ranges from about 5 mm (0.2 inches) to about 20 mm (0.8 inches).

6. The apparatus of claim 1 wherein the flow manipulator is spaced apart from the lower bed of solid particles by a distance within the range of from about 3 mm (0.1 inches) to about 38 mm (1.5 inches).

* * * * *